Dec. 6, 1966   R. S. LOVELAND   3,290,178
THERMOCOUPLE SUPPORTING MEANS
Filed Dec. 8, 1964   2 Sheets-Sheet 1

INVENTOR.
ROGER S. LOVELAND
BY
Alan M. Staubly
ATTORNEY

INVENTOR.
ROGER S. LOVELAND
BY Alan M. Staubly
ATTORNEY

United States Patent Office 3,290,178
Patented Dec. 6, 1966

3,290,178
THERMOCOUPLE SUPPORTING MEANS
Roger S. Loveland, Torrance, Calif., assignor to Honeywell Inc., Minneapolis, Minn., a corporation of Delaware
Filed Dec. 8, 1964, Ser. No. 418,593
8 Claims. (Cl. 136—242)

This application is a continuation-in-part application of my co-pending application, Serial No. 185,893, filed April 9, 1962.

This invention relates to a temperature responsive unit which is of such a shape that it is capable of serving as a replacement in practically all thermocouple-pilot burner combinations now being used in heating systems, either by itself or in combination with one of a plurality of adaptors or coupling members held thereon by means of a spring clip, which in some instances, is the sole means for supporting the temperature sensing unit on the bracket supporting the pilot burner. More particularly, the invention relates to a concentric thermocouple unit having spaced abutment means thereon which is adapted to selectively receive one of a plurality of adaptors and a spring clip type of fastening means which can selectively hold the adaptor on the thermocouple or be used to mount the thermocouple without an adaptor in the bracket supporting a pilot burner.

While it is old in the art to provide adaptors for thermocouples to enable the thermocouple to be used in different types of pilot burner thermocouple combinations, none of these prior art arrangements has ever made it possible for the means for fastening the adaptor to the thermocouple to also serve as a means for fastening the thermocouple in one or more of the commercial pilot burner and thermocouple combinations.

It is one of the objects of this invention to provide thermocouple replacement kits that will enable servicemen to substitute the thermocouples of the kits with a resilient latch or spring clip for substantially all of the thermocouples now in service.

Another object of the invention is to provide a universal thermocouple replacement kit having a minimum of parts to keep the cost thereof at a minimum.

A still further object of the invention is to provide a thermocouple design wherein one of a plurality of associated adaptors may be selectively mounted thereon and held thereon by means of the same or similar spring clip that is usable to mount the thermocouple directly on one of the thermocouple-pilot burner combinations now in use.

Other objects of the invention will become apparent upon reading the following detailed description of the invention in association with the accompanying drawing wherein.

Figures 1, 2, 3, 4:
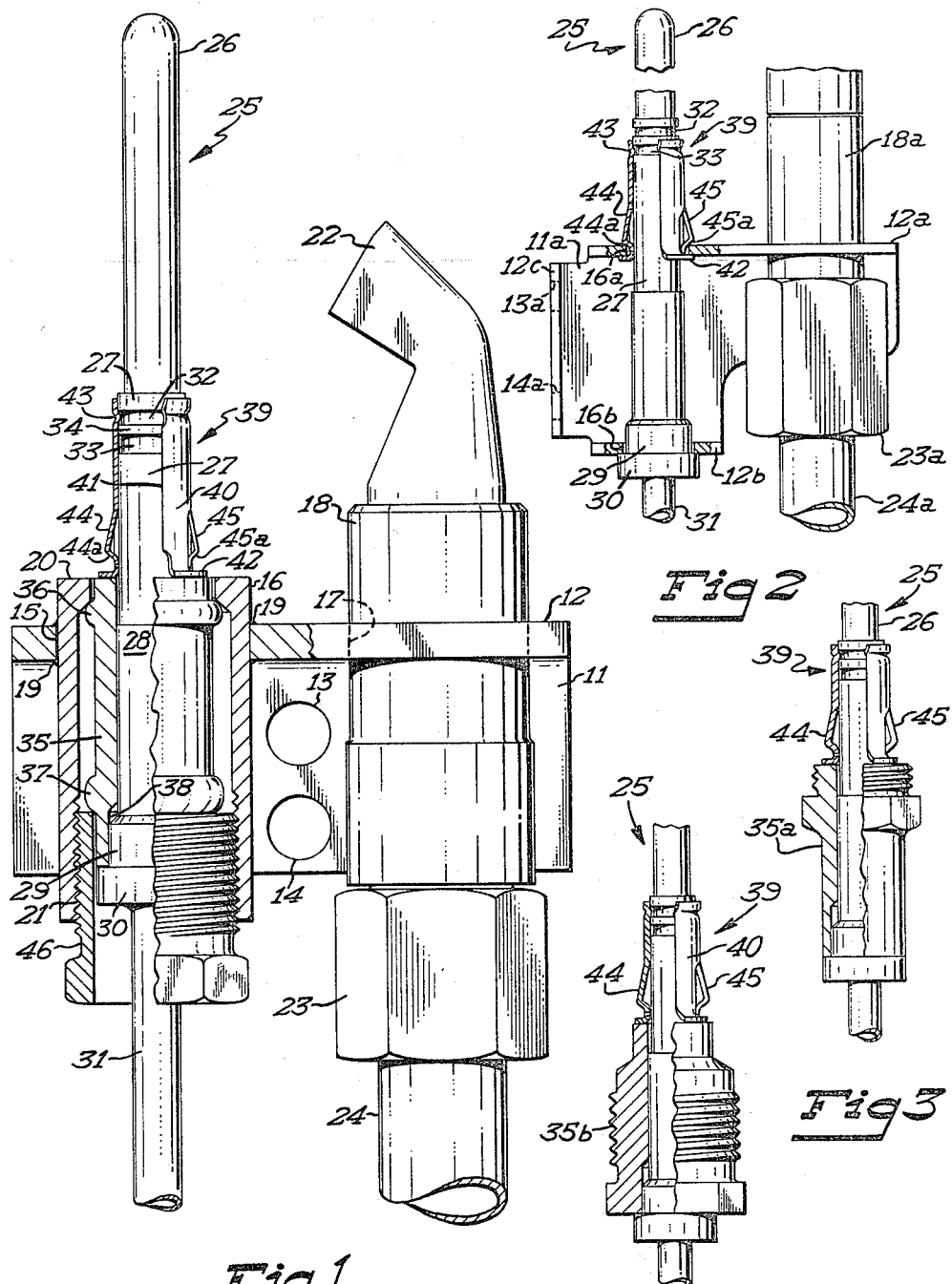
FIGURE 1 is a side elevational view of one modification of the invention, with parts thereof broken away.
FIGURE 2 is a similar view of the invention showing the thermocouple mounted in a bracket of another type of thermocouple and pilot burner combination.
FIGURE 3 is a fragmentary view of the thermocouple showing a second type of adaptor mounted thereon and partially broken away.
FIGURE 4 is a view similar to FIGURE 3 showing a third modification of an adaptor for mounting the thermocouple in a still different type of combination.

Referring to FIGURE 1 of the drawing, a bracket 11 has a transversely extending arm 12 with holes 13 and 14 therein for the reception of bolts (not shown) for mounting the bracket alongside of a main burner (not shown). The arm 12 has a hole 15 therein through which a mounting sleeve 16 extends and a hole 17 through which the tubular body 18 of the pilot burner extends. The members 16 and 18 are secured in the arm 12 by means of a weld 19 or by means of a force fit. The mounting sleeve 16 has an inwardly extending annular shoulder 20 thereon at its upper end and an internally threaded portion 21 at its lower end.

The burner body 18 has a head portion 22 extending from the upper end thereof and has a connector 23 mounted in the lower end thereof for connecting a gas supply conduit 24 thereto. The burner head 22 is so designed and positioned that it will direct a flame upwardly and across the axis of the sleeve 16.

A different type of mounting bracket and pilot burner is illustrated in FIGURE 2 of the drawing and is designated by the reference numeral 11a. It has a transversely extending upper arm 12a and a transversely extending lower arm 12b. A hole 16a in the upper arm and a larger or equal diameter hole 16b in the lower arm correspond with the openings through the upper end and the lower end of the adaptor 16 of FIGURE 1, for the reception of a thermocouple unit to be mounted therein. Mounting holes 13a and 14a in a third arm 12c, provide means for mounting the bracket 11a on a main burner. Brackets somewhat similar to those shown in FIGURES 1 and 2 of the drawing, but not shown in the drawing, are currently being used and are adapted to receive the mounting adaptors shown in FIGURES 3 and 4 of the drawing to hold a thermocouple unit in an optimum position to be heated by a pilot burner mounted on the bracket.

The thermocouple of this invention is generally designated by the reference numeral 25 and consists of an outer tubular member 26 and a coaxially arranged and internally disposed rod-shaped element (not shown) of well known construction. The thermocouple unit has an enlarged diameter, intermediate portion 27 and three increasingly larger stepped diameter portions 28, 29 and 30 at the lower end thereof. Extending from the lower end of the thermocouple unit is the outer tubular portion 31 of a pair of concentric leads, the inner lead not being shown, of well known construction. Near the upper end of the intermediate portion of the thermocouple unit are an annular groove 32 and an annular groove 33 spaced apart by a relatively narrow rib 34.

In order to mount the thermocouple unit 25 in the bracket and mounting sleeve 16, shown in FIGURE 1 of the drawing, a sleeve-shaped adaptor 35, having longitudinally spaced annular abutment shoulders 36 and 37, thereon, and an enlarged diameter bore 38 in the lower end thereof, surrounds the portions 29 and 28 and the lower end of portion 27 of the thermocouple unit, with the lower end of the sleeve resting on the annular shoulder provided between the portions 29 and 30. The adaptor 35 is held on the thermocouple unit 25 by means of a sleeve-shaped spring clip, generally designated by the reference numeral 39. The clip is one manufactured by Tinnerman Products, Inc., of Cleveland, Ohio, prior to this invention and consists of a piece of resilient sheet metal formed substantially into the shape of a tube or sleeve, except for a slight space between the opposite side edges 41 of the sheet metal, with the lower end thereof, as viewed in the drawing, outwardly flared to form an abutment flange at the lower end thereof and having an inwardly struck annular rib or detent 43 formed therein near the upper end thereof. Two diametrically opposed, outwardly extending and bent arms 44 and 45, formed by cutting them on their two sides and across their bottoms from the sidewalls of the member 40, provide abutment shoulders 44a and 45a in spaced relationship with respect to the upper surface of the annular flange 42. These shoulders, however, provide no useful function when the clip 39 is being used to hold the adaptor 35 on the thermocouple unit 25, the annular rib 43 engaging in the groove 32 providing the means for holding the lower surface of the annular flange 42 against the upper end of the adaptor 35 and the adaptor 35 against the enlarged diameter portion 30. With the adaptor 35 thus held on the thermocouple unit 25, a clamping nut 46, having external threads thereon, is screw threaded into the threaded lower end of the sleeve 16 to bear against the lower surface of the rib 37 and to force the upper surface of the rib 36 against the lower end of the flange 20 and, thereby, to hold the thermocouple unit securely in the bracket.

The adaptor 35a of FIGURE 3 and the adaptor 35b of FIGURE 4 are similarly held upon the thermocouple unit 25 so that the thermocouple may be mounted on different brackets (not shown) by having the threaded portion of the adaptors 35a and 35b screw threaded into brackets adapted to receive these respective adaptors.

When mounting the thermocouple unit 25 in the bracket 11a of FIGURE 2, no adaptor is needed. The spring clip 39 is first inserted in the upper opening 16a from the under side of the arm 12a, the arms 44 and 45 being deflected inwardly as they pass through the opening 16a. When the top surface of the flange 42 engages the under surface of the arm 12a, the arms 44 and 45 spring outwardly to position the shoulders 44a and 45a against the upper surface of the arm 12a and thus retain the clip on the bracket 11a. The thickness of the arm 12a is such that the space between the lower ends of the arms 44 and 45 is slightly larger than the outside diameter of the intermediate portion 27 of the thermocouple unit. Therefore, when the thermocouple unit 25 is inserted through the bottom hole 16b and the upper hole 16a, from below the bracket 11a, the thermocouple unit may extend past the arms 44 and 45 to a position wherein the portion 29 of the thermocouple unit fits in the hole 16b, with the portion 30 engaging the under surface of the arm 12b, and the inwardly extending rib portion 43 engages in the annular groove 33. It is deemed to be obvious that as the thermocouple is inserted into the clip 39, the clip springs or expands in diameter as the inwardly struck rib 43 engages the enlarged diameter portion of the intermediate portion 27 and then snaps back with the annular rib 43 engaging in either the groove 32 or 33, depending upon which one properly positions the thermocouple with the other cooperating elements that hold the thermocouple in the bracket in which it is being mounted.

Figure 5:
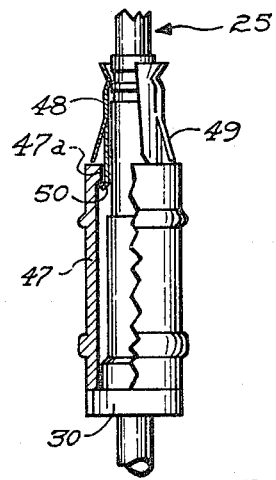
FIGURE 5 is a fragmentary view of a modification of the adaptor illustrated in FIGURE 1.

The adaptor 47 of FIGURE 5 is generally similar to the adaptor of FIGURE 1 except that it has an inwardly extending annular flange extension 47a and a uniform inner diameter from the flange to the lower end thereof. The spring clip 48 used with the adaptor 47 is similar to the clip 39 except that the spring fingers 49 are shorter and straight and the flange 50 at the lower end thereof is inclined at an angle greater than a right angle with respect to the main surface of the clip. The clip 48 is positioned in the adaptor 47 by being inserted at the lower end thereof and the fingers 49 forced past the flange 47a.

Figure 6:
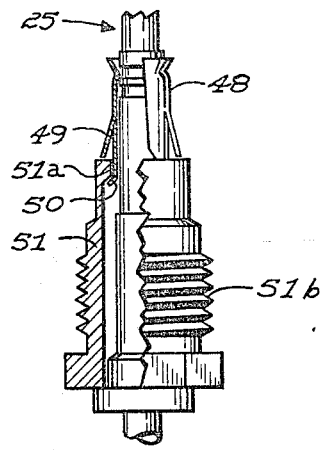
FIGURE 6 is a fragmentary view of a modification of the adaptor illustrated in FIGURE 4.

The adaptor 51 of FIGURE 6 is generally the same as the adaptor 35b of FIGURE 4 with the exception of an annular flange extension 51a holding the clip 48, as in FIGURE 5.

Figure 7:
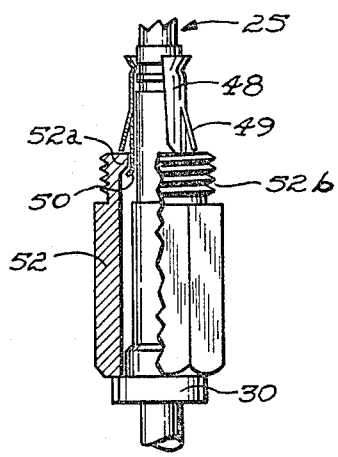
FIGURE 7 is a similar view of a modification of the adaptor illustrated in FIGURE 3.

The adaptor 52 of FIGURE 7 is similar to the adaptor 35a of FIGURE 3 with the same exceptions noted for the adaptor of FIGURE 6.

Figure 8:
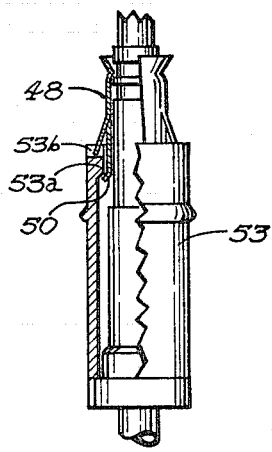
FIGURE 8 is a fragmentary view of a modification of the adaptor illustrated in FIGURE 5.

The adaptor 53 of FIGURE 8 is the same as adaptor 47 except that the lower external rib is not present and the upper end has an extension with diametrically opposed radial slots therein in which the lower ends of the clip arms 49 fit.

Figure 9:
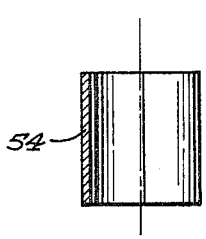
FIGURE 9 is a similar view of a split sleeve for use on the modification of FIGURE 8 to convert it to an adaptor which is the functional equivalent of the adaptor of FIGURE 5.

The split sleeve of FIGURE 9 has an inside diameter equal to the outside diameter of the adaptor 53 and an outside diameter equal to the diameter of the external rib thereon, and a length equal to the distance between the lower surfaces of the outer ribs on the adaptor 47, as viewed in FIGURE 5. By placing the split sleeve 54 on the lower end of the adaptor 53, it is converted to one that is the functional equivalent of the adaptors 35 and 47.

The adaptors 47 and 53 have an advantage over the adaptor 35 in that the pulling of the thermocouple axially from the assembly shown in FIGURE 1 does not leave the clip loose with respect to the adaptor. The same is true of the adaptors 51 and 52 with respect to adaptors 35b and 35a, respectively.

Figure 10:
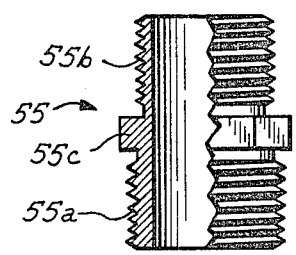
FIGURE 10 is a fragmentary view of a double ended sleeve-shaped nut for holding one of the adaptors and a thermocouple therein in one of a plurality of commercially available thermocouple-pilot burner combinations.

The double ended nut 55, illustrated in FIGURE 10, has an inner diameter slightly larger than the diameter of the portion 30 of the thermocouple, a half inch diameter nut portion 55a with 24 threads per inch thereon, a seven sixteenths inch diameter nut portion 55b with 27 threads per inch thereon, and a non-round or octagonal intermediate portion 55c for the reception of a wrench. The nut portion 55b is used to secure the adaptor 53 to a suitable bracket with or without sleeve 54 thereon. Nut portion 55a is used to secure adaptor 53 to a bracket having suitable threads.

From the above description of the invention, it is readily seen that a thermocouple design and three sets of associated mounting means therefor has been provided with a minimum of parts to make the thermocouple universally usable as a replacement for a thermocouple in practically all thermocouple pilot burner units which are presently being used. This is accomplished by providing selectively usable adaptors in combination with a spring clip member which can serve in two capacities, it being able to be used as the fastening means for holding the thermocouple unit in its supporting bracket in certain thermocouple generator assemblies or to be used as the securing means for holding an adaptor or the thermocouple when used on certain other thermoelectric generator assemblies. The thermocouple can be sold in a kit having the clip 39 and adaptors 35, 35a and 35b, or the clip 39 and adaptors 47, 51 and 52, with clip 48, or the adaptor 53 with clip 48, sleeve 54, nut 55, and clip 39.

As other modifications may be made in the invention without departing from the spirit thereof, the scope of the invention should be determined from the appended claims.

I claim:

1. A temperature responsive unit comprising a tubular member having a temperature-sensing end portion and a supporting end portion, said supporting end portion having a recess therein near the temperature-sensing end portion and an abutment thereon near its other end, a removable adaptor mounted on said supporting end portion with a first end thereof engaging said abutment and a second end thereof spaced from said recess, said adaptor having a portion thereof shaped for engagement with a support to position said unit thereon, and spring clip means mounted on said supporting end, said spring clip means having a diameter less than that of said adaptor and having abutment means thereon adapted to engage the second end of said adaptor, said spring clip means also having resilient detent means yieldably engaging said recess in said supporting end portion, said detent means being so shaped that axial movement of said tubular member with respect to said spring clip means will cause said detent means to disengage from said recess.

2. A thermocouple unit as defined in claim 1 wherein said adaptor and spring clip means are of substantially tubular shape.

3. A thermocouple unit comprising an elongated housing having a temperature-sensing end portion and a supporting end portion, said supporting end portion having a plurality of recesses therein near the temperature-sensing end portion and an abutment thereon near its other end, a removable adaptor mounted on said supporting end portion and having a first end engaging said abutment and a second end spaced from said recess, said adaptor being shaped for engagement with a support, and spring clip means of less overall width than said adaptor and mounted on said supporting end and having abutment means thereon adapted to engage the second end of said coupling member, said spring clip means also having resilient detent means spaced from said abutment means and engageable with one of said recesses in said supporting end.

4. A temperature responsive unit comprising a tubular member having a temperature-sensing end portion and a supporting end portion, said supporting end portion having a recess therein near the temperature-sensing end portion and an abutment thereon near its other end, removable adaptor means mounted on said supporting end portion with a first end thereof engaging said abutment and a second end thereof spaced from said recess, said adaptor means having a portion thereof shaped for engagement with a support to position said unit thereon, and spring clip means mounted on said supporting end, said spring clip means having a diameter less than that of said adaptor means and having abutment means thereon adapted to engage the second end of said adaptor means, said spring clip means also having detent means separate from and spaced from said abutment means thereon and engaging said recess in said supporting end portion.

5. A temperature responsive unit comprising a tubular member having a temperature-sensing end portion and a supporting end portion, said supporting end portion having first abutment means therein near the temperature-sensing end portion and second abutment means therein near its other end, removable adaptor means mounted on said supporting end portion with a first end thereof engaging said second abutment means and a second end thereof spaced from said first abutment means, said adaptor means having a portion thereof shaped for engagement with a support to position said unit thereon, and spring clip means mounted on said supporting end, said spring clip means having a diameter less than that of said adaptor means and having abutment means thereon adapted to engage a portion of the second end of said adaptor means, and having radially deflectable means having an abutment shoulder spaced from said abutment means on said spring clip means for additionally engaging said second end of said adaptor means, said spring clip means also having additional abutment means for operably engaging said first abutment means in said supporting end portion.

6. A temperature responsive control unit comprising an elongated member having a sensing portion and a supporting portion, said supporting portion having a first abutment near one end thereof and a second abutment near a second end thereof, a removable adaptor surrounding said supporting portion with one end of the adaptor engaging said second abutment and with a second end thereof spaced from said first abutment, spring clip means having a radially deflectable abutment means resiliently engaging said first abutment and disengageable from said first abutment by relative axial movement between said spring clip means and said elongated member, said spring clip means also having abutment means engaging said second end of said adaptor.

7. A control unit as defined in claim 6 wherein said abutment means engaging said second end of said adaptor is separate from and axially spaced from said radially deflectable abutment means.

8. A control unit as defined in claim 7 wherein said adaptor has an annular shoulder thereon and said abutment means engaging said second end of said adaptor has a relatively stiff portion for engaging one side of said shoulder and has a radially deflectable portion for engaging the other side of said shoulder.

References Cited by the Examiner

UNITED STATES PATENTS

| 2,140,442 | 12/1938 | Clark | 248—56 |
| 2,219,327 | 10/1940 | Miller | 248—56 |
| 2,952,409 | 9/1960 | Matthews | 158—131 |
| 2,954,248 | 9/1960 | Brickman | 248—56 |
| 3,002,554 | 10/1961 | Biggle | 158—130 |
| 3,005,487 | 10/1961 | Thiele | 158—131 |

FOREIGN PATENTS

| 606,024 | 9/1960 | Canada. |

WINSTON A. DOUGLAS, *Primary Examiner.*

A. M. BEKELMAN, *Assistant Examiner.*